US012602188B2

(12) United States Patent
Karakawa et al.

(10) Patent No.: US 12,602,188 B2
(45) Date of Patent: Apr. 14, 2026

(54) DISK DEVICE AND RECORDING METHOD

(71) Applicants:KABUSHIKI KAISHA TOSHIBA, Tokyo (JP); TOSHIBA ELECTRONIC DEVICES & STORAGE CORPORATION, Tokyo (JP)

(72) Inventors: Yuji Karakawa, Yokohama (JP); Osamu Yoshida, Kawasaki (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/823,510

(22) Filed: Sep. 3, 2024

(65) Prior Publication Data

US 2025/0291516 A1 Sep. 18, 2025

(30) Foreign Application Priority Data

Mar. 13, 2024 (JP) ................................. 2024-039456

(51) Int. Cl.
*G06F 3/06* (2006.01)
(52) U.S. Cl.
CPC .......... *G06F 3/0659* (2013.01); *G06F 3/0619* (2013.01); *G06F 3/0652* (2013.01); *G06F 3/0674* (2013.01)

(58) Field of Classification Search
CPC .... G06F 3/0659; G06F 3/0674; G06F 3/0619; G06F 3/0652
See application file for complete search history.

(56) References Cited

U.S. PATENT DOCUMENTS

| | | | |
|---|---|---|---|
| 8,271,968 B2 * | 9/2012 | Woodbury | ................ G06F 8/60 |
| | | | 717/169 |
| 2003/0081337 A1 | 5/2003 | Tanimoto | |
| 2009/0241103 A1 * | 9/2009 | Pennisi | ................... G06F 3/068 |
| | | | 713/323 |
| 2009/0290245 A1 | 11/2009 | Motoki | |
| 2010/0017633 A1 | 1/2010 | Inoue | |
| 2015/0081958 A1 * | 3/2015 | Li | .............................. G06F 1/30 |
| | | | 711/103 |
| 2015/0085394 A1 | 3/2015 | Ogawa et al. | |
| 2020/0264959 A1 | 8/2020 | Byun | |
| 2023/0064781 A1 * | 3/2023 | Schuh | ................... G06F 3/0679 |

FOREIGN PATENT DOCUMENTS

JP        2009-283085 A    12/2009

* cited by examiner

*Primary Examiner* — Mark A Giardino, Jr.
(74) *Attorney, Agent, or Firm* — Knobbe, Martens, Olson & Bear, LLP

(57) ABSTRACT

A disk device is controlled using system data. The disk device includes a disk, a non-volatile memory, and a controller. The controller is configured to record a set of system data on both the non-volatile memory and the disk.

12 Claims, 8 Drawing Sheets

Figure 4:
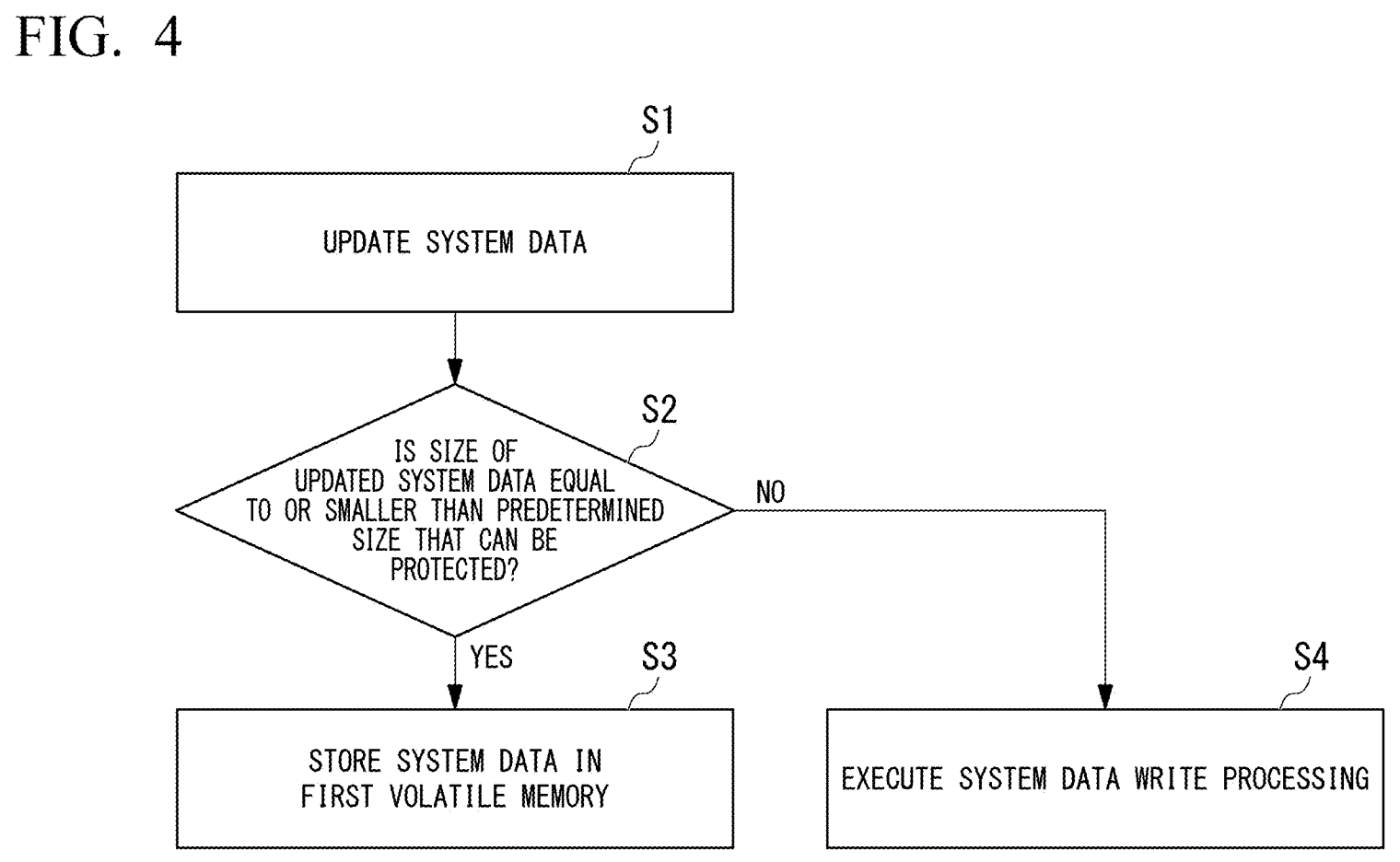

UPDATE SYSTEM DATA

S2

IS SIZE OF UPDATED SYSTEM DATA EQUAL TO OR SMALLER THAN PREDETERMINED SIZE THAT CAN BE PROTECTED?

NO

S4

EXECUTE SYSTEM DATA WRITE PROCESSING

YES

S3

STORE SYSTEM DATA IN FIRST VOLATILE MEMORY

DISK DEVICE AND RECORDING METHOD

CROSS-REFERENCE TO RELATED APPLICATION

This application is based upon and claims the benefit of priority from Japanese Patent Application No. 2024-039456, filed on Mar. 13, 2024; the entire contents of which are incorporated herein by reference.

FIELD

Embodiments described herein relate generally to a disk device and a recording method.

BACKGROUND

In a disk device, system data used to control the disk device is recorded on a disk. A set of system data is recorded plural times on the disk in order to increase the reliability of the disk device. For this reason, when the set of system data is updated, it is necessary to update all of a plurality of sets of system data recorded on the disk, resulting in a problem that a period of time required to update the set of system data plural times becomes longer. Thereby, there may be a defect such as a delay in a response from the disk device to a host device when the set of system data is updated, which may reduce user convenience.

BRIEF DESCRIPTION OF THE DRAWINGS

FIG. 1 is a block diagram showing a configuration of a disk device according to a first embodiment.

FIG. 2 is a perspective view showing the disk according to the first embodiment.

FIG. 4 is a flowchart showing a part of a control procedure of a controller according to the first embodiment.

DETAILED DESCRIPTION

Figure 3:
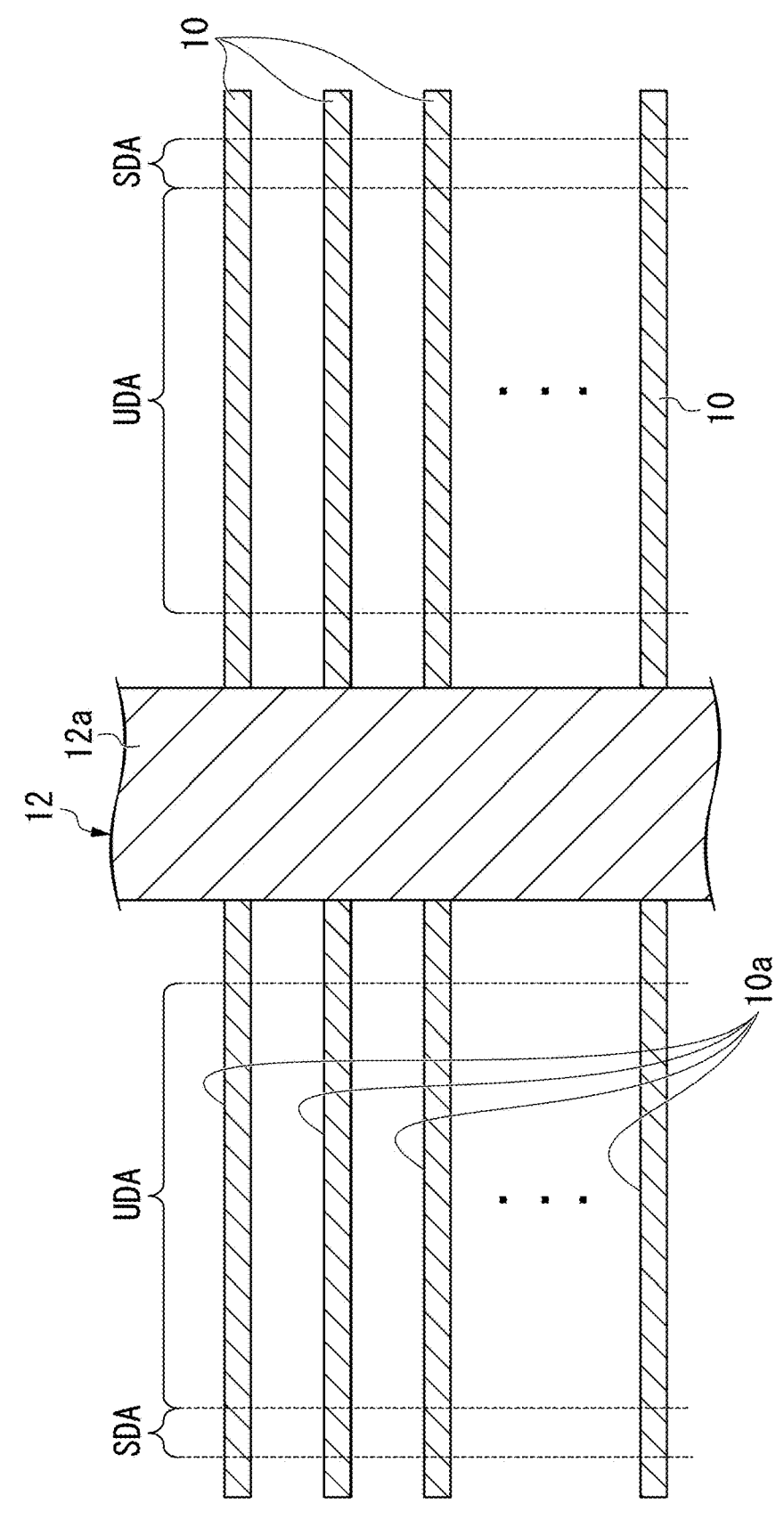
FIG. 3 is a cross-sectional view showing the disk according to the first embodiment.

A disk device according to embodiments is a disk device that is controlled using system data. The disk device includes a disk, a non-volatile memory, and a controller. The controller is configured to record a set of system data on both the non-volatile memory and the disk.

Hereinafter, a disk device and a recording method according to embodiments will be described with reference to the drawings.

First Embodiment

Figure 1:
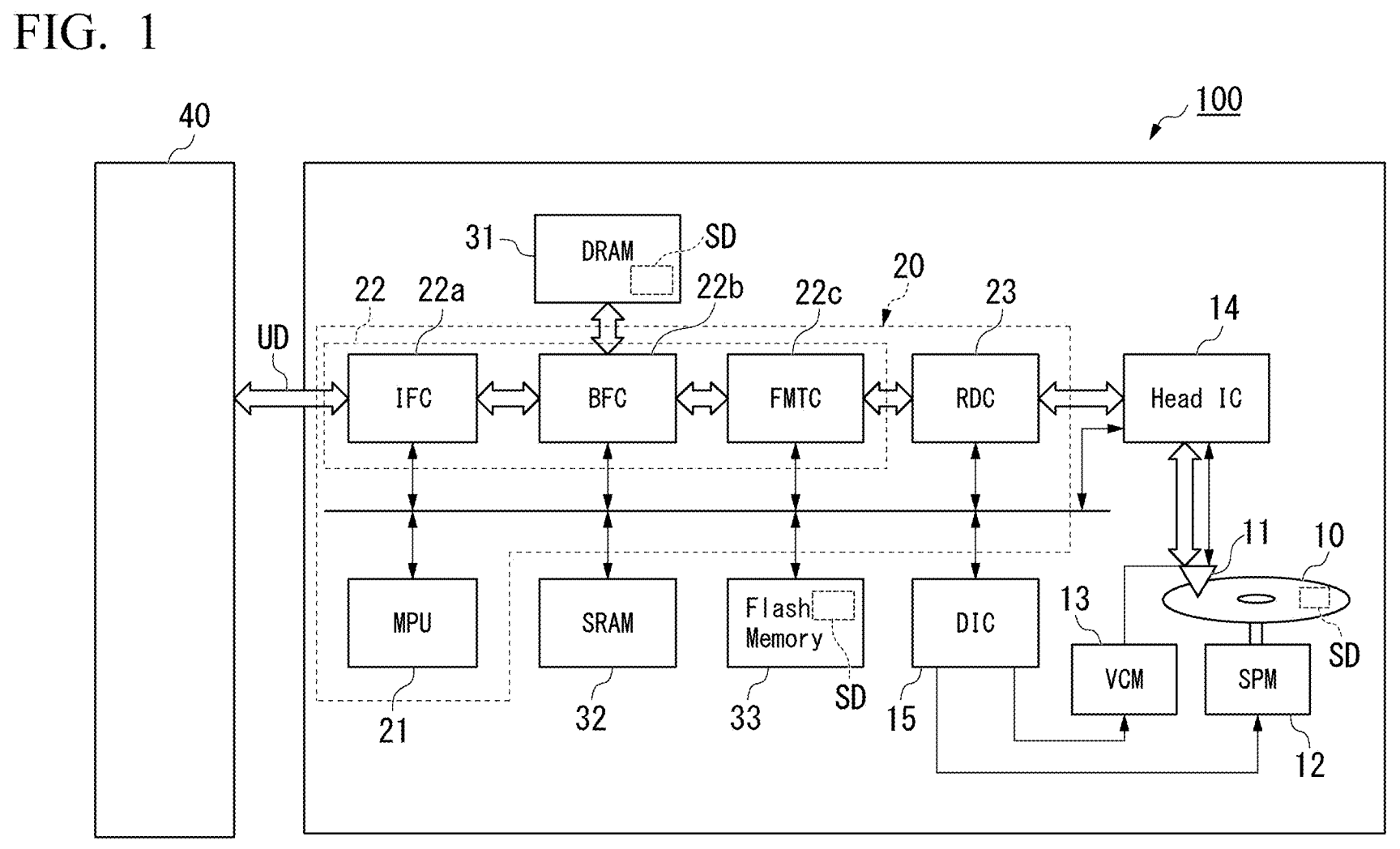

FIG. 1 is a block diagram showing a configuration of a disk device 100 according to this embodiment. The disk device 100 according to this embodiment shown in FIG. 1 is a magnetic disk device that includes a built-in hard disk drive. The disk device 100 can store information as digital data. The disk device 100 is driven based on commands received from a host device 40. The host device 40 is, for example, a personal computer. The host device 40 is not particularly limited as long as it is a device that issues commands to the disk device 100. The host device 40 can cause the disk device 100 to record information and read data recorded on the disk device 100.

As shown in FIG. 1, the disk device 100 includes a disk 10, a head 11, a spindle motor 12, a voice coil motor 13, a head amplifier IC 14, a driver IC 15, a controller 20, a first volatile memory 31, a second volatile memory 32, and a non-volatile memory 33. The disk device 100 is controlled using system data SD. The system data SD is recorded on the disk device 100. The system data SD includes, for example, data indicating the location of defects in a recording area of the disk 10, data for driving the spindle motor 12 and the voice coil motor 13, data for driving the head 11, table data for managing the system data SD, and the like.

Figure 2:
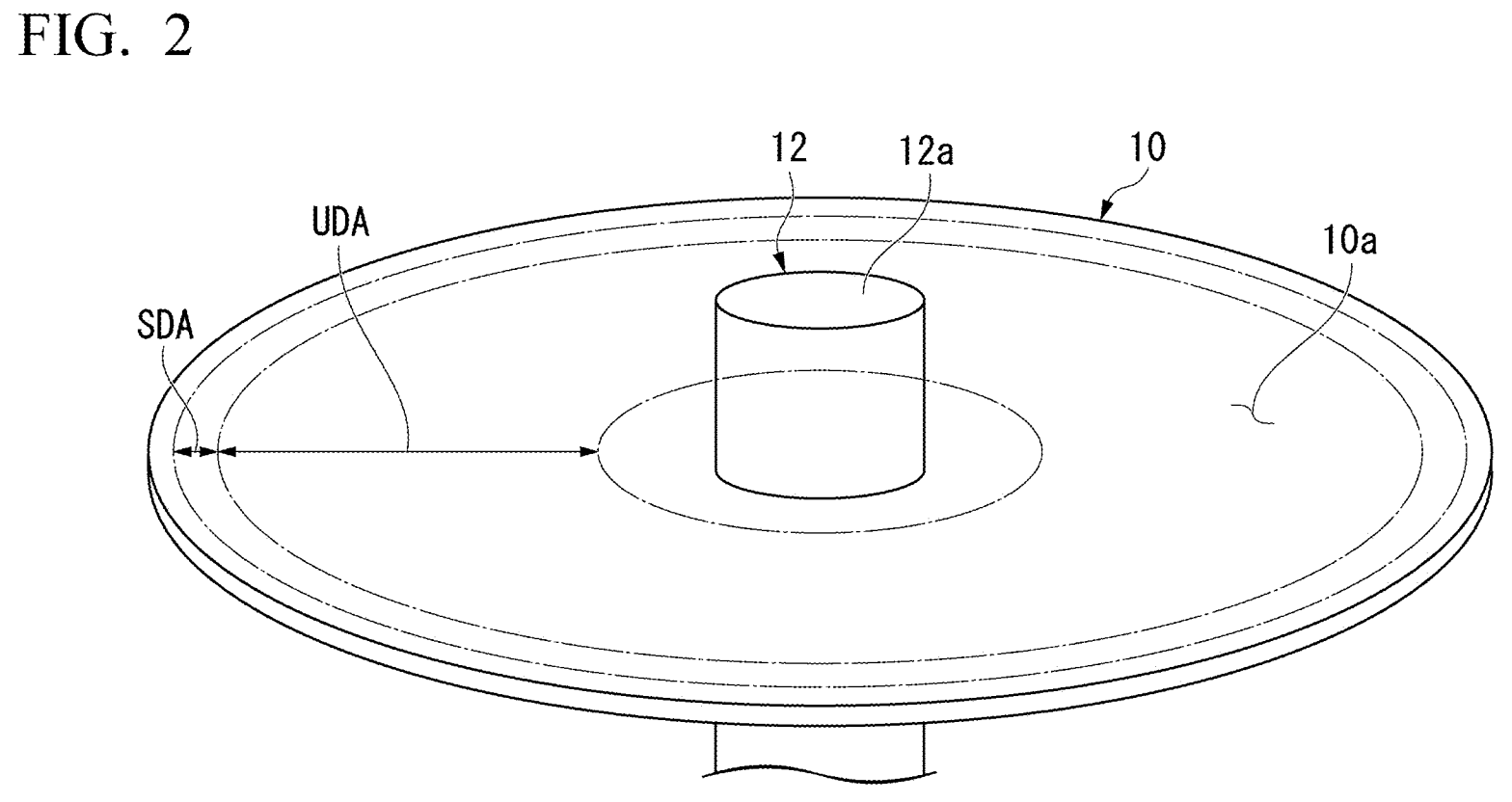

In this embodiment, the disk 10 is a magnetic disk. FIG. 2 is a perspective view showing the disk 10. The disk 10 has a disk shape. The disk 10 is connected to a shaft 12a of the spindle motor 12. The disk 10 has a recording surface 10a. The recording surface 10a has a user data area UDA and a system data area SDA. User data transmitted from the host device 40 is recorded in the user data area UDA. The system data SD used to control the disk device 100 is recorded in the system data area SDA. A plurality of sets of duplicated system data SD are recorded in the system data area SDA.

In the example in FIG. 2, the system data area SDA is located on the outer circumference side of the recording surface 10a with respect to the user data area UDA. The user data area UDA may be divided into user date on the inner circumference side of the recording surface 10a and user date on the outer circumference side of the recording surface 10a, and the system data area SDA may be interposed between the user data area UDA on the inner circumference side and the user data area UDA on the outer circumference side.

FIG. 3 is a cross-sectional view showing the disk 10. As shown in FIG. 3, in this embodiment, a plurality of disks 10 are arranged at intervals in the axial direction of the shaft 12a. In the example in FIG. 3, each of the plurality of disks 10 has the user data area UDA and the system data area SDA. Only some of the plurality of disks 10 may have the system data area SDA. The disks 10 are rotated around the central axis of the shaft 12a by the spindle motor 12.

The head 11 shown in FIG. 1 is a magnetic head that can read data recorded on the disk 10 and write data to the disk 10. Although not shown in the drawing, the head 11 includes a read head that reads data recorded on the disk 10 and a write head that writes data to the disk 10. The head 11 is provided for each disk 10. The head 11 is moved to a position facing the recording surface 10a of disk 10 and a position not facing the recording surface 10a of disk 10 by the voice coil motor 13. The head 11 can read data from the recording surface 10a and write data to the recording surface 10a at a position facing the recording surface 10a.

Although not shown in the drawing, the head amplifier IC 14 includes a read amplifier and a write driver. The read amplifier amplifies a signal of data read from the disk 10 by the head 11 and outputs the amplified signal to a read/write channel 23 to be described later in the controller 20. The write driver outputs a write current corresponding to the data output from the read/write channel 23 to the head 11. The head 11 writes data to the disk 10 based on the write current output from the write driver.

The driver IC 15 controls the driving of the spindle motor 12 and the driving of the voice coil motor 13 based on commands received from the controller 20.

The controller 20 is a system controller that controls the disk device 100. The controller 20 is, for example, a large scale integrated circuit (LSI) referred to as a system-on-a-chip (SoC) in which a plurality of elements are integrated into a single chip. The controller 20 is electrically connected to the head amplifier IC 14, the driver IC 15, the first volatile memory 31, the second volatile memory 32, and the non-volatile memory 33. The controller 20 includes a microprocessor 21, a hard disk controller 22, and a read/write channel 23.

The hard disk controller 22 controls data transfer between the host device 40 and the read/write channel 23 based on commands received from the microprocessor 21. The hard disk controller 22 is electrically connected to the microprocessor 21, the read/write channel 23, the head amplifier IC 14, the driver IC 15, the first volatile memory 31, the second volatile memory 32, and the non-volatile memory 33. The hard disk controller 22 includes an interface control unit 22a, a buffer control unit 22b, and a format control unit 22c. The interface control unit 22a controls an interface between disk device 100 and the host device 40. The interface control unit 22a reads a command input from the host device 40, and performs data reception, data transfer, and the like. The buffer control unit 22b temporarily records data input from the host device 40 via the interface control unit 22a and data read from the disk 10 in the first volatile memory 31. The format control unit 22c converts the format of the data input from the buffer control unit 22b and the data input from the read/write channel 23.

The read/write channel 23 executes signal processing of data transmitted from the disk 10 to the host device 40 and data transmitted from the host device 40 to the disk 10 based on commands received from the microprocessor 21. The read/write channel 23 has a function of measuring the signal quality of data, for example.

The first volatile memory 31 and the second volatile memory 32 are semiconductor memories whose stored data is lost when the supply of power is cut off. In this embodiment, data is temporarily recorded on the first volatile memory 31 by the buffer control unit 22b. In this embodiment, the first volatile memory 31 is a dynamic random access memory (DRAM). Data necessary for processing in each part of the disk device 100, and the like are recorded on the second volatile memory 32. In this embodiment, the second volatile memory 32 is a static random access memory (SRAM). The first volatile memory 31 and the second volatile memory 32 may be provided integrally as one volatile memory. The first volatile memory 31 may be an SRAM, a synchronous dynamic random access memory (SDRAM), a ferroelectric random access memory (FeRAM), a magnetoresistive random access memory (MRAM), or the like. The second volatile memory 32 may be a DRAM, an SDRAM, a FeRAM, an MRAM, or the like.

The non-volatile memory 33 is a semiconductor memory that continuously stores recorded data even when the supply of power is cut off. In this embodiment, the non-volatile memory 33 is a flash memory. The non-volatile memory 33 is, for example, a NOR type or NAND type flash memory. At least some of programs for driving the disk device 100, data required before reading and writing data to and from the disk 10, and the like are recorded on the non-volatile memory 33. In this embodiment, the set of system data SD that is recorded on the system data area SDA of the disk 10 is recorded on the non-volatile memory 33 plural times. The number of the set of system data SD recorded on the non-volatile memory 33 may be one.

In FIG. 1, white arrows indicate a flow of the user data UD. The user data UD input from the host device 40 to the disk device 100 is input to the buffer control unit 22b via the interface control unit 22a and is temporarily recorded on the first volatile memory 31 by the buffer control unit 22b. The user data UD recorded on the first volatile memory 31 is read by the buffer control unit 22b and converted into a format recordable on the disk 10 by the format control unit 22c. The converted user data UD is transmitted to the head amplifier IC 14 via the read/write channel 23 and written from the head 11 to the disk 10. When the user data UD recorded on the disk 10 is read by the host device 40, the user data UD is read in the reverse procedure of the above-described procedure in which the user data UD is written to the disk 10, for example.

The microprocessor 21 is a control unit that controls each part of the disk device 100 and is a main controller. The microprocessor 21 controls the voice coil motor 13 via the driver IC 15 and executes servo control for positioning the head 11. The microprocessor 21 controls the spindle motor 12 via the driver IC 15 to rotate the disk 10. The microprocessor 21 controls an operation of writing data to the disk 10 (write operation). The microprocessor 21 selects a storage destination for data to be written to the disk 10. The microprocessor 21 controls an operation of reading data recorded on the disk 10 (read operation). The microprocessor 21 controls the processing of data read from the disk 10. The microprocessor 21 is electrically connected to each part of the disk device 100.

The microprocessor 21 is configured to execute power loss protection processing for protecting at least a part of one or more sets of data recorded on the first volatile memory 31 by recording it on the non-volatile memory 33 when the supply of power to the disk device 100 is stopped. When the microprocessor 21 determines that the supply of power to the disk device 100 is stopped based on an output from a power monitoring unit (not shown), the microprocessor 21 executes power loss protection processing for recording data, which is recorded on the first volatile memory 31, on the non-volatile memory 33. When the power loss protection processing is executed, power is supplied to each part of disk device 100 from a capacitor (not shown) included in the disk device 100. In this manner, the disk device 100 of this embodiment is equipped with a power loss protection function.

The controller 20 is configured to execute system data write processing. The system data write processing is processing that includes processing for writing the set of system data SD to the non-volatile memory 33 and processing for writing the set of system data SD to the disk 10. The system data write processing is executed when the set of system data SD is updated. The set of system data SD is updated by, for example, the host device 40. In this embodiment, the system data write processing is executed by the microprocessor 21. A recording method for the system data SD used to control the disk device 100 includes executing the system data write processing.

FIG. 4 is a flowchart showing a part of a control procedure of the controller 20. In this embodiment, the control procedure shown in FIG. 4 is executed by the microprocessor 21 of the controller 20. As shown in FIG. 4, when the set of system data SD is updated (step S1), the controller 20 determines whether or not the size of the set of system data SD updated is equal to or smaller than a predetermined size that can be protected by the power loss protection function (step S2). When the set of system data SD is updated, the set of system data SD updated is temporarily recorded on the first volatile memory 31 from the host device 40 via the interface control unit 22a and the buffer control unit 22b.

When the controller determined the size of the set of system data SD updated is equal to or smaller than the predetermined size (step S2: YES), the controller 20 does not immediately start the system data write processing, but stores the set of system data SD updated, which is temporarily recorded on the first volatile memory 31, on the first volatile memory 31 as it is (step S3). On the other hand, when the controller determined the size of the set of system data SD updated is larger than the predetermined size (step S2: NO), the controller 20 executes the system data write processing (step S4). Among the sets of system data SD, data having a size equal to or smaller than the predetermined size is, for example, table data for managing the system data SD.

Figure 5:
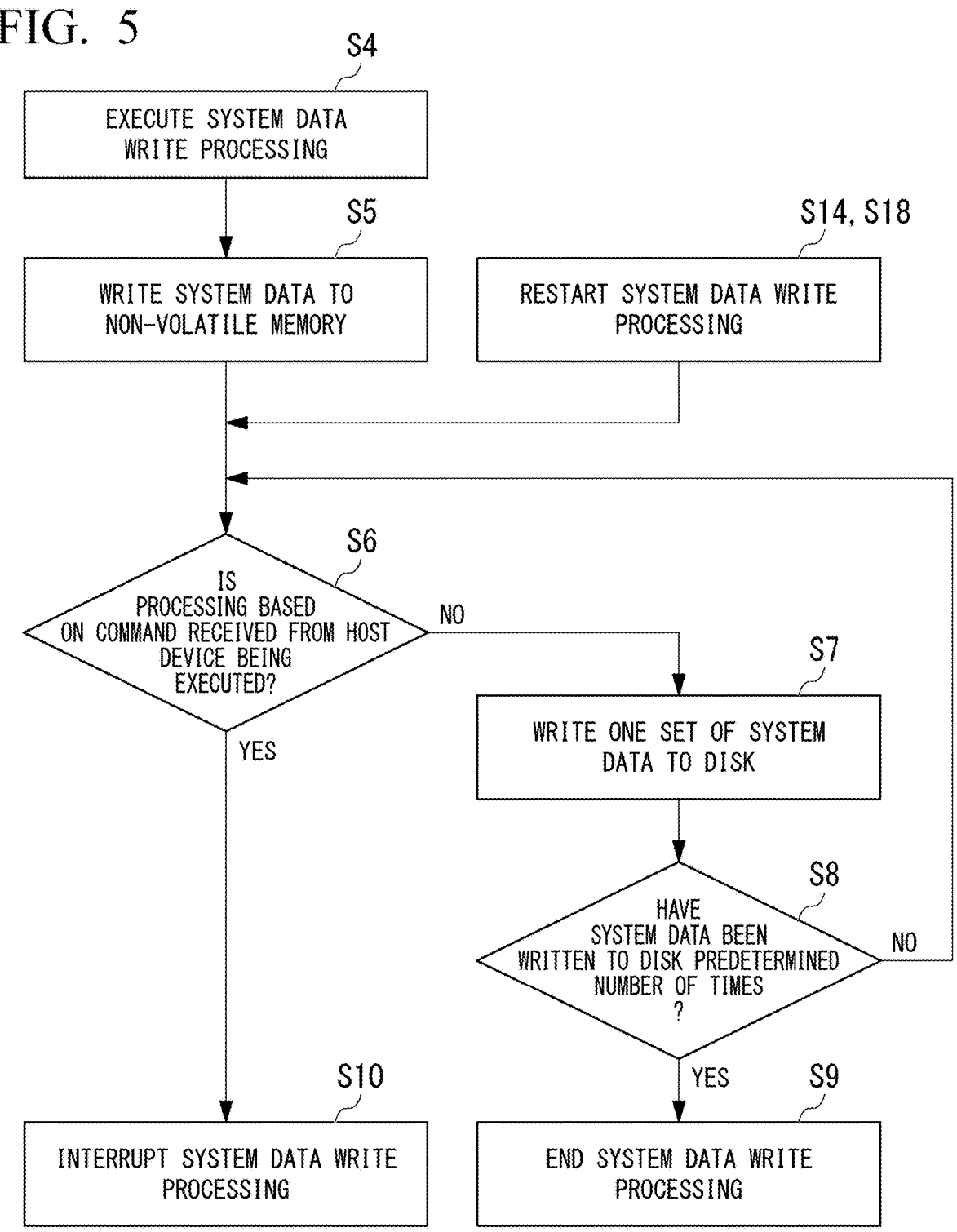
FIG. 5 is a flowchart showing an example of a procedure of system data write processing according to the first embodiment.

FIG. 5 is a flowchart showing an example of a procedure of system data write processing. As shown in FIG. 5, in the system data write processing, the controller 20 writes the set of system data SD to the non-volatile memory 33 (step S5). After the set of system data SD is written to the non-volatile memory 33, the controller 20 determines whether or not processing based on a command received from the host device 40 is being executed (step S6). In this embodiment, the processing in step S6 corresponds to determination processing for determining whether or not processing based on a command received from the host device 40 is being executed. The processing based on the command received from the host device 40 includes, for example, processing for writing the user data UD to the disk 10, processing for reading the user data UD from the disk 10, and the like.

When the controller 20 determined in step S6 that the processing based on the command received from the host device 40 is not being executed, the controller 20 writes the set of system data SD to the disk 10 (step S7). In this manner, in the system data write processing in this embodiment, the controller 20 writes the set of system data SD to the disk 10 after writing the set of system data SD to the non-volatile memory 33. Further, in the system data write processing in this embodiment, the controller 20 executes determination processing for determining whether or not processing based on a command received from the host device 40 is being executed, that is, the processing of step S6, before writing the set of system data SD to the disk 10.

In step S7 in this embodiment, the controller 20 copies the set of system data SD temporarily recorded on the first volatile memory 31 and writes the set of system data SD copied to the disk 10 in the manner as when the user data UD is written to the disk 10 as described above. In this manner, the controller 20 is configured to record the set of system data SD on both the non-volatile memory 33 and the disk 10. In step S7, the controller 20 may copy the set of system data SD recorded on the non-volatile memory 33 and write the set of system data SD copied to the disk 10.

After the set of system data SD is written to the disk 10 in step S7, the controller 20 determines whether or not the set of system data SD have been written to the disk 10 predetermined number of times (step S8). In this embodiment, the predetermined number of times to write the set of system data SD to the disk 10 is two or more. In other words, in the system data write processing in this embodiment, the controller 20 writes the set of system data SD to the disk 10 plural times. The predetermined number of times to write the set of system data SD to the disk 10 may be one.

When the controller 20 determined in step S8 that the set of system data SD have not yet been written to the disk 10 the predetermined number of times (step S8: NO), the controller 20 executes step S6 again, and writes the set of system data SD to the disk 10 again (step S7) when the processing based on the command received from the host device 40 is not executed. In this manner, in the system data write processing in this embodiment, the controller 20 executes the above-described determination processing, that is, the processing of step S6, at each timing before the set of system data SD is written to the disk 10. When the controller 20 determined in step S8 that the set of system data SD have been written to the disk 10 the predetermined number of times (step S8: YES), the controller 20 ends the system data write processing (step S9).

In this embodiment, a plurality of sets of system data SD are stored to be separated into the set of system data SD recorded on the non-volatile memory 33 and the set of system data SD recorded on the disk 10. In other words, in this embodiment, the controller 20 continuously maintains a state where at least the set of system data SD is recorded on each of the non-volatile memory 33 and the disk 10 after the system data write processing ends.

When it is determined in step S6 that the processing based on the command received from the host device 40 is being executed (step S6: YES), the controller 20 interrupts the system data write processing (step S10). When the system data write processing is interrupted, the controller 20 suspends execution of the system data write processing until a timing at which the set of system data SD can be written to the disk 10 comes. The timing at which the set of system data SD can be written to the disk 10 includes a case where the controller 20 executes specific processing. In other words, when the controller 20 interrupts the system data write processing, the controller 20 restarts the system data write processing when the specific processing is executed.

"The controller 20 restarts the system data write processing when the specific processing is executed" includes a case where the controller 20 restarts the system data write processing before the specific processing is executed after it is determined that the specific processing is executed, a case where the controller 20 restarts the system data write processing while the specific processing is being executed, and a case where the controller 20 restarts the system data write processing immediately after the specific processing is executed.

The above-described specific processing includes processing in which a period of time required to execute the processing is sufficiently longer than a period of time required to write the set of system data SD to the disk 10, and processing that does not require a response to the host device 40. In this embodiment, "another period of time is sufficiently longer than a certain period of time" includes a case where the other period of time is 10 times longer or more than the certain period of time.

Specifically, in this embodiment, the above-described specific processing includes spin-up processing for increasing the rotational speed of the disk 10 to a specific rotational speed and unloading processing for separating the head 11 from the disk 10. The spin-up processing is processing that is executed before data is written to the disk 10 or read from the disk 10. The spin-up processing is processing in which a period of time required to execute the processing is sufficiently longer than a period of time required to write the set of system data SD to the disk 10. The unloading processing is processing that is executed when a command received from the host device 40 is not input for a predetermined period of time or more. The unloading processing is processing that does not require a response to the host device 40. In the unloading processing, the controller 20 moves the head 11 to a position that does not face the disk 10.

The controller 20 determines that, for example, the timing immediately after the spin-up processing ends, and the timing before the unloading processing is executed after the execution of the unload processing is determined to be a timing at which the set of system data SD can be written to the disk 10, that is, a timing at which the system data write processing can be restarted.

Figure 6:
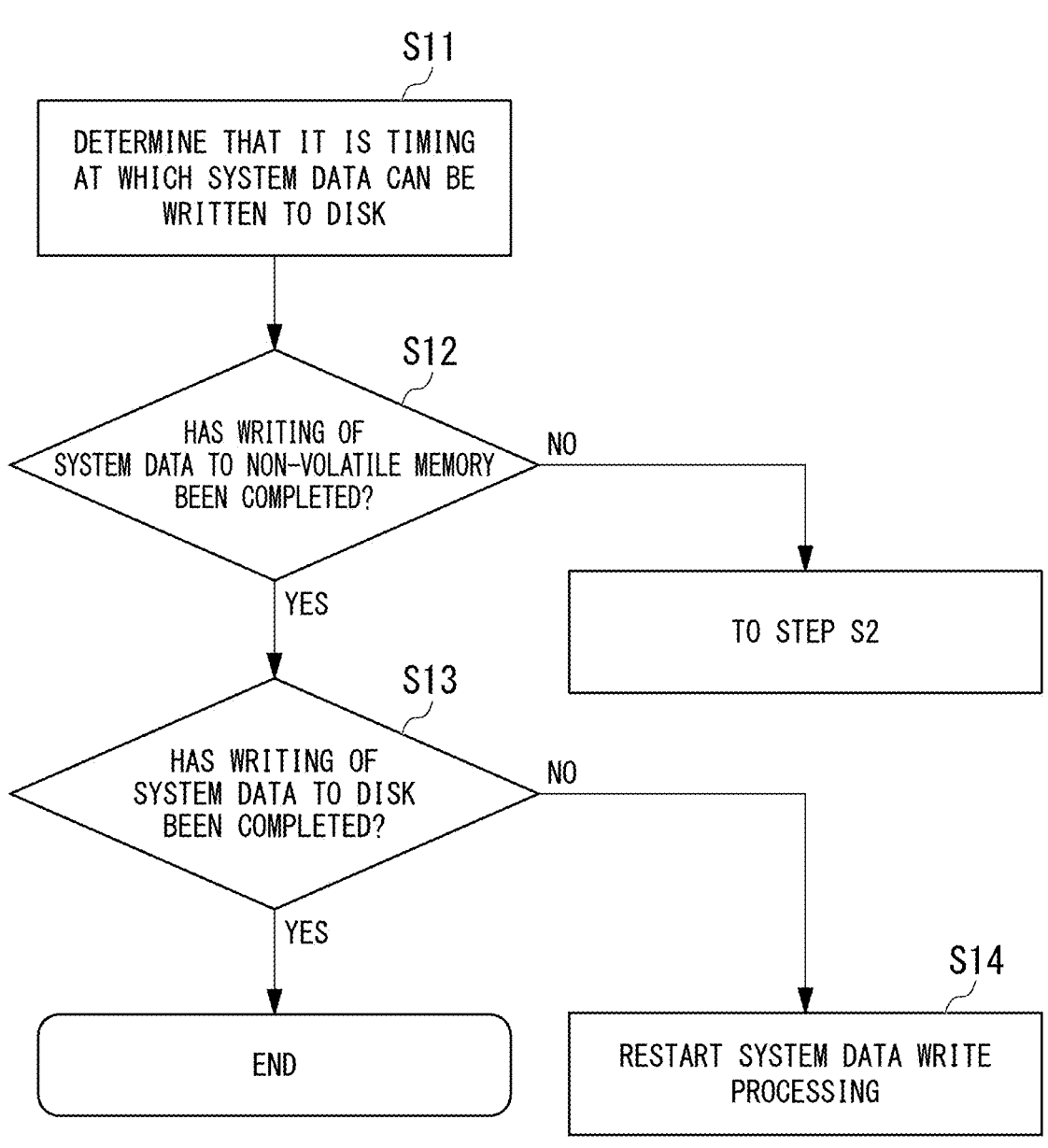
FIG. 6 is a flowchart showing another part of the control procedure of the controller according to the first embodiment.

FIG. 6 is a flowchart showing another part of the control procedure of the controller 20. In this embodiment, the control procedure shown in FIG. 6 is executed by the microprocessor 21 of the controller 20. As shown in FIG. 6, when the controller 20 determines that it is the timing at which the set of system data SD can be written to the disk 10 (step S11), the controller 20 determines whether or not the process of writing the set of system data SD to the non-volatile memory 33 has been completed (step S12). When the controller 20 determined that the process of writing the set of system data SD to the non-volatile memory 33 has not been completed (step S12: NO), the controller 20 executes step S2 described above. When the controller 20 determined in step S2 that the size of the set of system data SD updated is equal to or smaller than a predetermined size that can be protected, there is no interrupted system data write processing, and thus the controller 20 does not execute and restart the system data write processing.

When the set of system data SD is updated, step S2 described above is normally executed. For this reason, when the size of the set of system data SD updated exceeds a predetermined size that can be protected by a power loss protection function, the system data write processing is executed, and writing to the non-volatile memory 33 is executed regardless of whether or not processing based on a command received from the host device 40 is being executed. Thus, when the size of the set of system data SD updated exceeds the predetermined size, processing up to writing of the set of system data SD to the non-volatile memory 33 is normally executed. However, when any error or the like occurs and the set of system data SD is updated, the system data write processing may be interrupted before the writing of the set of system data SD to the non-volatile memory 33 is completed. Even in this case, the system data write processing can be restarted by determining whether or not the set of system data SD has been written to the non-volatile memory 33 in step S12, and the set of system data SD can be written to the non-volatile memory 33.

When the controller 20 determined that the process of writing the set of system data SD to the non-volatile memory 33 has been completed (step S12: YES), the controller 20 determines whether or not the process of writing the system data SD to the disk 10 has been completed (step S13). In step S13, the controller 20 determines whether or not the process of writing the set of system data SD to the disk 10 the predetermined number of times has been completed. When the controller 20 determined in step S13 that the process of writing the set of system data SD to the disk 10 the predetermined number of times has been completed (step S13: YES), the controller 20 determines that there is no interrupted system data write processing and does not execute and restart the system data write processing. On the other hand, when the controller 20 determined in step S13 that the process of writing the set of system data SD to the disk 10 the predetermined number of times has not been completed (step S13: NO), the controller 20 restarts the system data write processing (step S14). As shown in FIG. 5, when the system data write processing is restarted in step S14, the controller 20 restarts the system data write processing from step S6.

Figure 7:
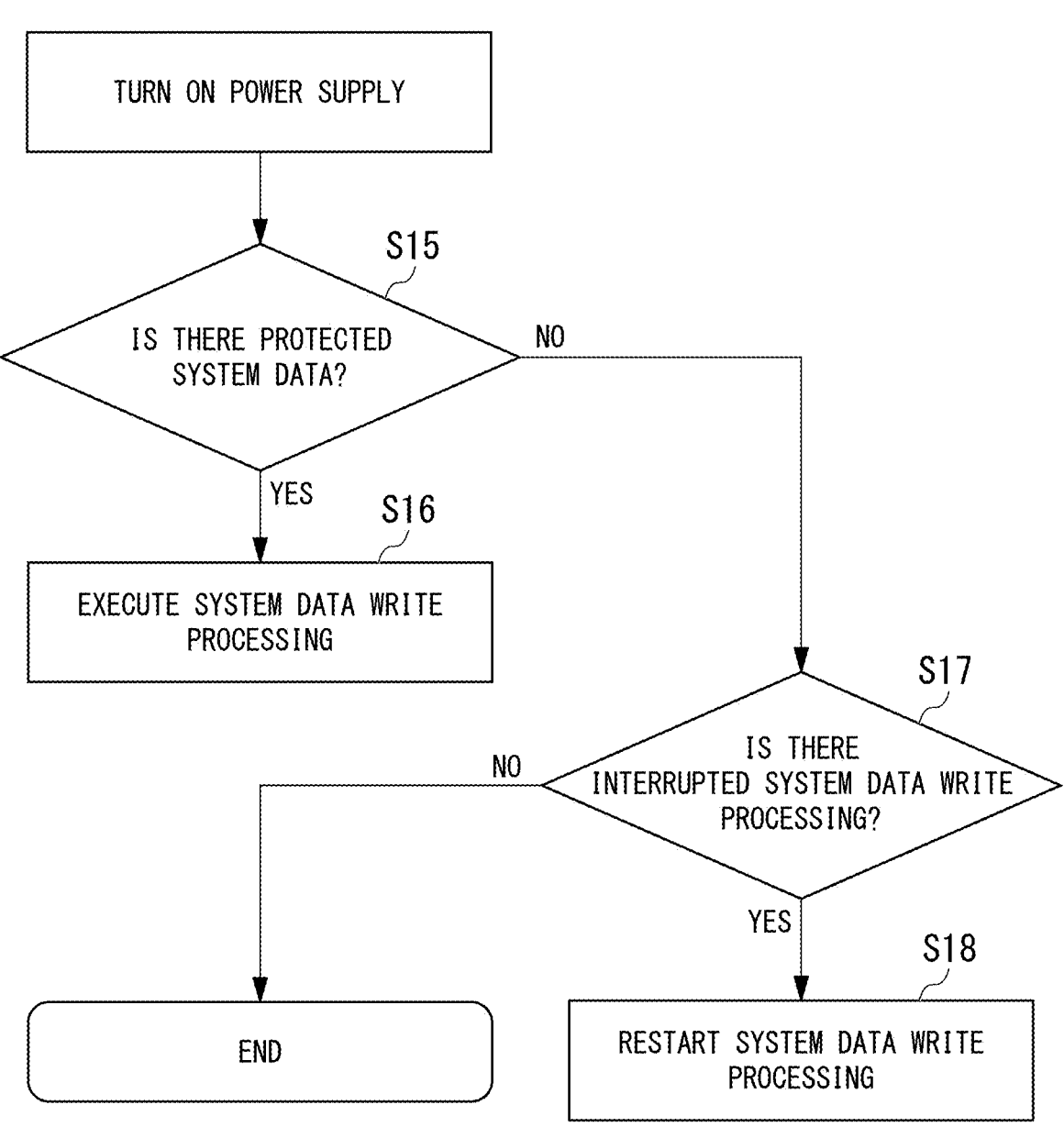
FIG. 7 is a flowchart showing still another part of the control procedure of the controller according to the first embodiment.

Next, a control procedure of the controller 20 when the power supply of the disk device 100 is switched from an OFF state to an ON state will be described. FIG. 7 is a flowchart showing still another part of the control procedure of the controller 20. In this embodiment, the control procedure shown in FIG. 7 is executed by the microprocessor 21 of the controller 20. As shown in FIG. 7, when the power supply of the disk device 100 is turned on, the controller 20 determines whether or not the set of system data SD is protected by the power loss protection function (step S15). When the set of system data SD is protected by the power loss protection function, the set of system data SD is recorded on the non-volatile memory 33. In step S15, the controller 20 determines whether or not the set of system data SD is in the recording area of the non-volatile memory 33 in which the data is recorded when the data is protected by the power loss protection function. In the following description, the area in the recording area of the non-volatile memory 33 in which data is recorded when the data is protected by the power loss protection function will be referred to as a protection area.

When the controller 20 determined in step S15 that the set of system data SD is protected by the power loss protection function (step S15: YES), the controller 20 executes the system data write processing (step S16). In other words, in a case where the set of system data SD is protected by the power loss protection function at a time when the power supply of the disk device 100 is turned on, the controller 20 executes the system data write processing. In this case, in step S5 of the system data write processing, the controller 20 writes the set of system data SD recorded on the protection area of the non-volatile memory 33 to the area in the recording area of the non-volatile memory 33 on which the set of system data SD is recorded.

When the controller 20 determined in step S15 that the set of system data SD is not protected by the power loss protection function (step S15: NO), the controller 20 determines whether or not the system data write processing is interrupted (step S17). In step S17, the controller 20 determines whether or not the process of writing the set of system data SD to the disk 10 the predetermined number of times has been completed and determines whether or not the system data write processing is interrupted. In other words, in a case where the controller 20 determined that the set of system data SD is not protected by the power loss protection function at a time when the power supply of the disk device 100 is turned on, the controller 20 determines whether or not the system data write processing is interrupted.

When the controller 20 determined in step S17 that the system data write processing is interrupted (step S17: YES), the controller 20 restarts the system data write processing interrupted (step S18). In other words, in a case where controller 20 determined that the system data write processing is interrupted at a time when the power supply of the disk device 100 is turned, the controller 20 restarts the system data write processing. As shown in FIG. 5, when the system data write processing is restarted in step S18, the controller 20 restarts the system data write processing from step S6. As shown in FIG. 7, when the controller 20 determined in step S17 that the system data write processing is not interrupted (step S17: NO), the controller 20 does not write the set of system data SD.

According to this embodiment, the disk device 100 is a disk device controlled using the system data SD, and includes the disk 10, the non-volatile memory 33, and the controller 20. The controller 20 is configured to record the set of system data SD on both the non-volatile memory 33 and the disk 10. In other words, a recording method for the system data SD includes recording the set of system data SD on both the non-volatile memory 33 and the disk 10. For this reason, some of a plurality of sets of system data SD that need to be recorded can be recorded in the non-volatile memory 33. A period of time required to write the set of system data SD to the non-volatile memory 33 is shorter than a period of time required to write the set of system data SD to the disk 10. For this reason, a period of time required to record all of the plurality of sets of system data SD can be reduced compared to when all of the plurality of sets of system data SD are written to the disk 10. Thereby, even when the set of system data SD that is recorded plural times is updated, a delay in response from the disk device 100 to the host device 40 can be suppressed. Thus, it is possible to reduce the influence on the response to the host device 40 when the set of system data SD is updated.

Further, according to this embodiment, the controller 20 is configured to execute the system data write processing including the processing for writing the set of system data SD to the non-volatile memory 33 and the processing for writing the set of system data SD to the disk 10. In the system data write processing, the controller 20 is configured to write the set of system data SD to the disk 10 after writing the set of system data SD to the non-volatile memory 33. In other words, the recording method for the system data SD includes executing the system data write processing including processing for writing the set of system data SD to the non-volatile memory 33 and processing for writing the set of system data SD to the disk 10, and the system data write processing includes writing the set of system data SD to the disk 10 after writing the set of system data SD to the non-volatile memory 33. For this reason, by first recording the set of system data SD updated in the non-volatile memory 33, which takes a relatively short writing time, it is possible to sequentially write the set of system data SD to the disk 10, which takes a relatively long writing time, while maintaining the state where at least the set of system data SD is recorded. Thereby, a timing at which the writing to the disk 10 is performed is set to be a timing that does not affect a response to the host device 40 or has less influence on the response to the host device 40, and thus the set of system data SD can be written to the disk 10 while reducing the influence on the response to the host device 40.

Further, according to this embodiment, the controller 20 is configured to continue to maintain a state where at least the set of system data SD is recorded on the non-volatile memory 33 and the disk 10 after the system data write processing ends. In other words, a recording method for the system data SD includes continuing to maintain a state where at least the set of system data SD is recorded on the non-volatile memory 33 and the disk 10 after the system data write processing ends. For this reason, at least the set of system data SD that need to be recorded plural times can also be recorded on the non-volatile memory 33. Thereby, the system data area SDA for recording the system data SD on the disk 10 can be made smaller, and the user data area UDA for recording the user data UD on the disk 10 can be made larger. Further, the capacity of the non-volatile memory 33 can be made smaller than when all of the sets of system data SD that need to be recorded are recorded on the non-volatile memory 33.

Further, according to this embodiment, in the system data write processing, the controller 20 is configured to: execute determination processing for determining whether or not processing based on a command received from the host device 40 is being executed before writing the set of system data SD to the disk 10, write at least the set of system data SD to the disk 10 when it is determined in the determination processing that processing based on a command received from the host device 40 is not being executed, and interrupt the system data write processing when it is determined in the determination processing that processing based on a command received from the host device 40 is being executed. In other words, the recording method for the system data SD includes executing determination processing for determining whether or not processing based on a command received from the host device 40 is being executed in the disk device 100 before the set of system data SD is written to the disk 10 in the system data write processing, writing at least the set of system data SD to the disk 10 when it is determined in the determination processing that processing based on a command received from the host device 40 is not being executed, and interrupting the system data write processing when it is determined in the determination processing that processing based on a command received from the host device 40 is being executed. For this reason, when processing based on a command received from the host device 40 is being executed, the set of system data SD is not written to the disk 10 which takes a relatively long writing time. Thereby, it is possible to further suppress a delay in response to the host device 40, and further reduce the influence on the response to the host device 40. Further, when a timing is such that the processing based on a command received from the host device 40 is not being executed and does not affect the response to the host device 40, it is possible to write the set of system data SD to the disk 10 and rapidly proceed with the system data write processing.

Further, according to this embodiment, in the system data write processing, the controller 20 is configured to: write the set of system data SD to the disk 10 plural times and execute the above-described determination processing at each timing before writing the set of system data SD to the disk 10. In other words, in the recording method for the system data SD, the system data write processing includes writing the set of system data SD to the disk 10 plural times and executing the above-described determination processing at each timing before writing the set of system data SD to the disk 10. For this reason, for example, even when a command is input from the host device 40 while the set of system data SD is being written to the disk 10, the system data write processing can be interrupted immediately after the set of system data SD is written. Thereby, it is possible to further suppress a delay in response to the host device 40 and further reduce the influence on the response to the host device 40.

Further, according to this embodiment, the controller 20 is configured to restart the system data write processing when specific processing is executed in a case where the system data write processing is interrupted. In other words, the recording method for the system data SD includes restarting the system data write processing when specific processing is executed in a case where the system data write processing is interrupted. For this reason, by setting the specific processing to processing that does not affect a response to the host device 40 or has less influence on the response to the host device 40, it is possible to restart the system data write processing while reducing the influence on the response to the host device 40.

Further, according to this embodiment, the above-described specific processing includes spin-up processing for increasing the rotational speed of the disk 10 to a specific rotational speed. A sufficiently longer period of time is required to execute the spin-up processing than a period of time required to write the set of system data SD to the disk 10. For this reason, even when the set of system data SD is written to the disk 10 after the spin-up processing is executed, a period of time that is increased by the period of time required to write the set of system data SD to the disk 10 can be regarded as an error with respect to the time required for the spin-up processing. Thus, even when the set of system data SD is written to the disk 10 after the spin-up processing is executed, it may be difficult for a user to recognize that a response to the host device 40 is delayed due to the writing of the set of system data SD to the disk 10. For this reason, it is possible to further reduce the influence on the response to the host device 40.

Further, according to this embodiment, the disk device 100 includes the head 11 that is configured to read data recorded on the disk 10 and write data to the disk 10. The above-described specific processing includes unloading processing for separating the head 11 from the disk 10. The unloading processing is processing that is executed when a command received from the host device 40 is not executed for a predetermined period of time. For this reason, a timing at which the unloading processing is determined to be executed is a timing at which there is no need to respond to the host device 40 and it is considered that there is a high possibility that a response to the host device 40 will not occur immediately. Thus, it is possible to further reduce the influence on the response to the host device 40 by writing the set of system data SD to the disk 10 before executing the unloading processing at the timing when the unloading processing is determined to be executed.

Further, according to this embodiment, the disk device 100 includes the first volatile memory 31. The disk device 100 is equipped with a power loss protection function of protecting at least a part of one or more sets of data recorded on the first volatile memory 31 by recording at least the part of the one or more sets of data on the non-volatile memory 33 when the supply of power to the disk device 100 is stopped. The controller 20 is configured to, when the set of system data SD is updated, determine whether or not the size of the set of system data SD updated is equal to or smaller than a predetermined size that can be protected by the power loss protection function, store the set of system data SD updated in the first volatile memory 31 when the controller 20 determined that the size of the set of system data SD updated is equal to or smaller than the predetermined size, and execute the system data write processing and write the set of system data SD updated to the non-volatile memory 33 when the controller 20 determined that the size of the set of system data SD updated is larger than the predetermined size. In other words, the recording method for the system data SD includes, when the set of system data SD is updated, determining whether or not the size of the set of system data SD updated is equal to or smaller than the predetermined size that can be protected by the power loss protection function, storing the set of system data SD updated in the first volatile memory 31 when it is determined that the size of the set of system data SD updated is equal to or smaller than the predetermined size, and executing the system data write processing and writing the set of system data SD updated to the non-volatile memory 33 when it is determined that the size of the set of system data SD updated is larger than the predetermined size. For this reason, when the set of system data SD whose size is equal to or smaller than the predetermined size that can be protected by the power loss protection function is updated, the set of system data SD updated can be stored in the first volatile memory 31 without writing the set of system data SD to the non-volatile memory 33 while power is being supplied to the disk device 100. Thereby, the frequency of rewriting the set of system data SD recorded on the non-volatile memory 33 can be reduced. Thus, it is possible to prevent the number of times of rewriting of data in the non-volatile memory 33 from reaching an upper limit.

Further, according to this embodiment, the controller 20 is configured to execute the system data write processing in a case where the controller 20 determined that the set of system data SD is protected by the power loss protection function at a time when the power supply of the disk device 100 is turned on. The controller 20 is configured to determine whether or not the system data write processing is interrupted in a case where the controller determined that the set of system data SD is not protected by the power loss protection function at a time when the power supply of the disk device 100 is turned on. The controller 20 is configured to restart the system data write processing in a case where the controller 20 determined that the system data write processing is interrupted. In other words, the recording method for the system data SD includes executing the system data write processing in a case where it is determined that the set of system data SD is protected by the power loss protection function at a time when the power supply of the disk device 100 is turned on, determining whether or not the system data write processing is interrupted in a case where it is determined that the set of system data SD is not protected by the power loss protection function when the power supply of the disk device 100 is turned on, and restarting the system data write processing in a case where it is determined that the system data write processing is interrupted. For this reason, even when the power supply of the disk device 100 is turned off before the system data write processing is executed and before the system data write processing is completed, it is possible to proceed with the system data write processing when the power supply of the disk device 100 is turned on. Further, a period of time required for processing executed when the power supply of the disk device 100 is turned on is sufficiently longer than a period of time required for the system data write processing. For this reason, even when the system data write processing is executed when the power supply of the disk device 100 is turned on, it is difficult for a user to recognize that a response to the host device 40 is delayed due to the system data write processing. For this reason, the influence on the response to the host device 40 can be further reduced.

Second Embodiment

A second embodiment differs from the first embodiment in a part of a control procedure of the controller 20. In the following description, the components as those in the embodiment described above may be given the reference numerals as those in the embodiment described appropriate, and the description thereof may be omitted.

Figure 8:
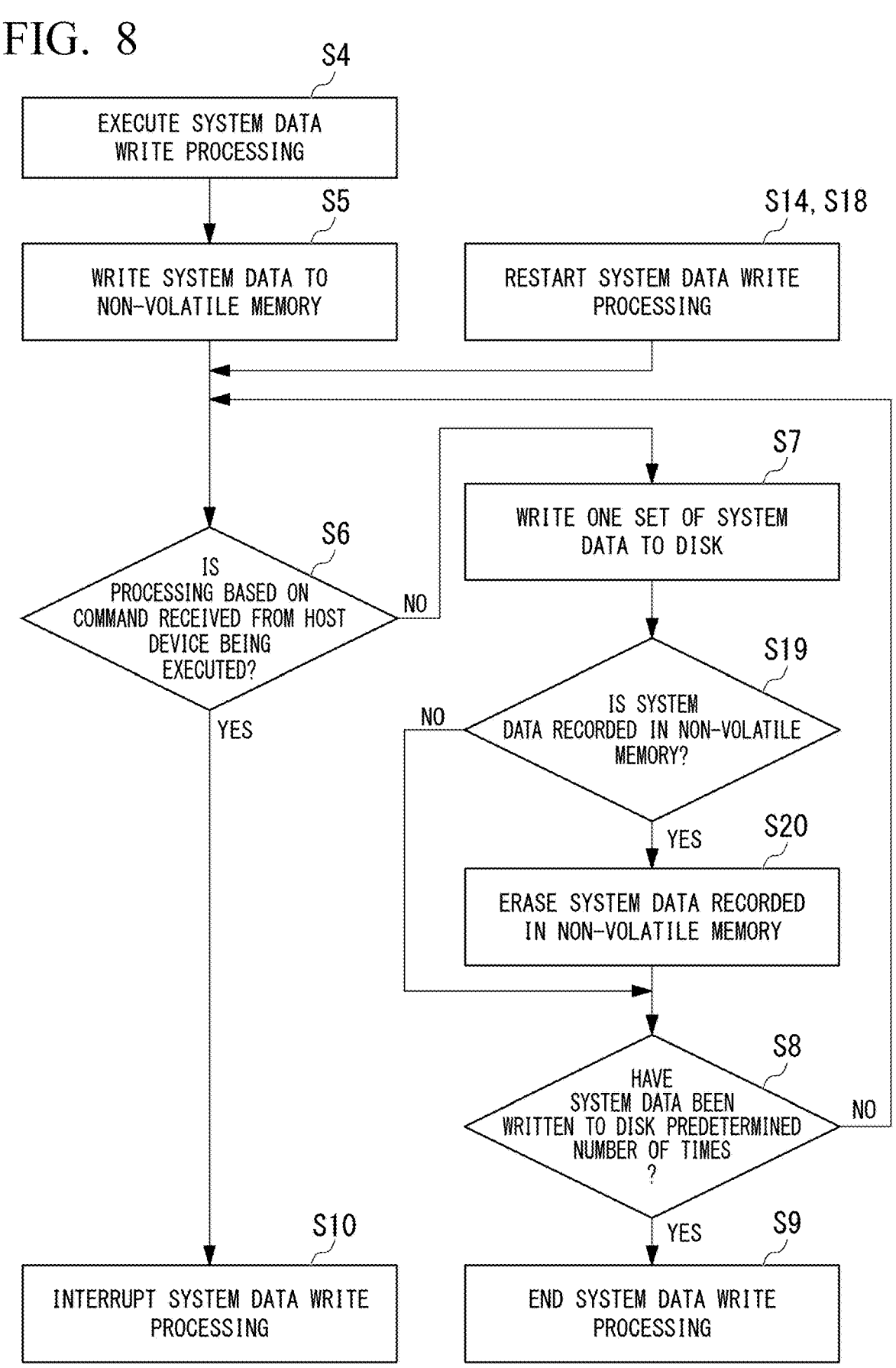
FIG. 8 is a flowchart showing an example of a procedure of system data write processing according to a second embodiment.

FIG. 8 is a flowchart showing an example of a procedure of system data write processing in this embodiment. As shown in FIG. 8, in the system data write processing in this embodiment, step S19 and step S20 are provided between step S7 and step S8. In this embodiment, the controller 20 writes the set of system data SD to the disk 10 in step S7 and then executes step S19. In step S19, the controller 20 determines whether or not the set of system data SD is recorded on a non-volatile memory 33. When it is determined in step S19 that the set of system data SD is recorded on the non-volatile memory 33 (step S19: YES), the controller 20 executes step S20. In step S20, the controller 20 erases the set of system data SD recorded on the non-volatile memory 33. In other words, in this embodiment, the controller 20 writes at least the set of system data SD to the disk 10 in the system data write processing and then erases the set of system data SD written on the non-volatile memory 33. After the set of system data SD recorded on the non-volatile memory 33 is erased, the controller 20 executes step S8.

When it is determined in step S19 that the set of system data SD is not recorded on the non-volatile memory 33 (step S19: NO), the controller 20 executes step S8 without executing step S20. In step S7 after deleting the set of system data SD recorded on the non-volatile memory 33 in step S20, the controller 20 may copy the set of system data SD recorded on the disk 10 and write it to the disk 10 or may copy the set of system data SD recorded on the first volatile memory 31 and write it to the disk 10. The other control procedures performed by the controller 20 are similar to the other control procedures performed by the controller 20 in the first embodiment.

As described above, in this embodiment, the set of system data SD is temporarily recorded on the non-volatile memory 33 until the set of system data SD is written to the disk 10, but the set of system data SD recorded on the non-volatile memory 33 is erased after even the set of system data SD is written to the disk 10. For this reason, in this embodiment, when the system data write processing is completed, all of the plurality of sets of system data SD are recorded on the disk 10.

According to this embodiment, the controller 20 is configured to erase the set of system data SD written on the non-volatile memory 33 after writing the set of system data SD to the disk 10 in the system data write processing. In other words, a recording method for the system data SD in this embodiment includes erasing the set of system data SD written on the non-volatile memory 33 after writing the set of system data SD to the disk 10 in the system data write processing. For this reason, an area in the non-volatile memory 33 where the set of system data SD is recorded can be used as an area in which the other set of system data SD updated is recorded when the other set of system data SD is updated. Thereby, an area reserved for recording the set of system data SD on the non-volatile memory 33 is only required to be set to such a size as to be able to temporarily record the set of system data SD updated when the set of system data SD is updated. Thus, the area for recording the set of system data SD on the non-volatile memory 33 can be reduced, and the capacity of the non-volatile memory 33 can be reduced.

According to at least one embodiment described above, the disk device 100 is a disk device that is controlled using system data SD. The disk device 100 includes the disk 10, the non-volatile memory 33, and the controller 20. The controller 20 is configured to record the set of system data SD on both the non-volatile memory 33 and the disk 10. Thereby, it is possible to reduce the influence on a response to the host device 40 when the set of system data SD is updated.

Any number of sets of system data SD recorded on the disk device 100 may be recorded as long as they are recorded on the disk device 100. Further, in the disk device 100, when the set of system data SD can be recorded on both the non-volatile memory 33 and the disk 10, a plurality of sets of system data SD stored in a steady state may be recorded to be separated into the non-volatile memory 33 and the disk 10 as in the first embodiment, or may be recorded only on the disk 10 as in the second embodiment. When the set of system data SD is stored separately in the non-volatile memory 33 and the disk 10, the number of sets of system data SD recorded on the non-volatile memory 33 and the number of sets of system data SD recorded on the disk 10 may be the same or may be different from each other. The disk device 100 does not need to be equipped with a power loss protection function. The disk 10 that is included in the disk device 100 may be a disk other than a magnetic disk, such as an optical disk, as long as data can be recorded thereon. The controller 20 may include at least one of the first volatile memory 31, the second volatile memory 32, the non-volatile memory 33, the head amplifier IC 14, and the driver IC 15. The controller 20 may not include at least one or more parts other than the microprocessor 21.

At least some of the functions of the controller 20 described in the embodiments described above are implemented, for example, by the microprocessor 21 executing a program, that is, software, recorded on at least one of the non-volatile memory 33 and the disk 10. At least some of the functions of the controller 20 may be, for example, implemented by hardware including a circuit unit such as an application specific integrated circuit (ASIC), a field-programmable gate array (FPGA), a graphics processing unit (GPU), and an LSI in the above-described embodiments, or may be implemented by software and hardware in cooperation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device that is controlled using system data, the disk device comprising:

a disk;

a non-volatile memory; and a controller, wherein the controller is configured to record a set of system data on both the non-volatile memory and the disk, the controller is configured to execute system data write processing including processing for writing the set of system data to the non-volatile memory and processing for writing the set of system data to the disk, and the controller is configured to write the set of system data to the disk after writing the set of system data to the non-volatile memory in the system data write processing, and in the system data write processing, the controller is configured to:

execute determination processing for determining whether or not processing based on a command received from a host device is being executed before writing the set of system data to the disk, write at least the set of system data to the disk when it is determined in the determination processing that the processing based on the command is not being executed, and interrupt the system data write processing when it is determined in the determination processing that the processing based on the command is being executed.

2. The disk device according to claim 1, wherein, in the system data write processing, the controller is configured to:

write the set of system data to the disk plural times, and execute the determination processing at each timing before writing the set of system data to the disk.

3. The disk device according to claim 1, wherein the controller is configured to restart the system data write processing when specific processing is executed in a case where the system data write processing is interrupted.

4. The disk device according to claim 3, wherein the specific processing includes spin-up processing for increasing a rotational speed of the disk to a specific rotational speed.

5. The disk device according to claim 3, further comprising a head that is configured to read data recorded on the disk and write data to the disk, wherein the specific processing includes unloading processing for separating the head from the disk.

6. A disk device that is controlled using system data, the disk device comprising:

a disk;

a non-volatile memory;

a controller; and a volatile memory, wherein the controller is configured to record a set of system data on both the non-volatile memory and the disk, the controller is configured to execute system data write processing including processing for writing the set of system data to the non-volatile memory and processing for writing the set of system data to the disk, and the controller is configured to write the set of system data to the disk after writing the set of system data to the non-volatile memory in the system data write processing, the disk device is equipped with a power loss protection function of protecting at least a part of one or more sets of data recorded on the volatile memory by recording at least the part of the one or more sets of data on the non-volatile memory when supply of power to the disk device is stopped, and the controller is configured to, when the set of system data is updated:

determine whether or not a size of the set of system data updated is equal to or smaller than a predetermined size that can be protected by the power loss protection function, store the set of system data updated in the volatile memory when the controller determined that the size of the set of system data updated is equal to or smaller than the predetermined size, and execute the system data write processing and write the set of system data updated to the non-volatile memory when the controller determined that the size of the set of system data updated is larger than the predetermined size.

7. The disk device according to claim 6, wherein the controller is configured to:

execute the system data write processing in a case where the controller determined that the set of system data is protected by the power loss protection function at a time when a power supply of the disk device is turned on, determine whether or not the system data write processing is interrupted in a case where the controller determined that the set of system data is not protected by the power loss protection function at a time when the power supply of the disk device is turned on, and restart the system data write processing in a case where the controller determined that the system data write processing is interrupted.

8. A recording method for system data used to control a disk device including a disk and a non-volatile memory, the recording method comprising:

recording a set of system data on both the non-volatile memory and the disk;

executing system data write processing including processing for writing the set of system data to the non-volatile memory, processing for writing the set of system data to the disk, and writing the set of system data to the disk after writing the set of system data to the non-volatile memory;

executing determination processing for determining whether or not processing based on a command received from a host device is being executed in the disk device before the set of system data is written to the disk in the system data write processing;

writing at least the set of system data to the disk when it is determined in the determination processing that the processing based on the command is not being executed; and interrupting the system data write processing when it is determined in the determination processing that the processing based on the command is being executed.

9. The recording method according to claim 8, wherein the system data write processing includes writing the set of system data to the disk plural times, and executing the determination processing at each timing before writing the set of system data to the disk.

10. The recording method according to claim 8, further comprising restarting the system data write processing when specific processing is executed in a case where the system data write processing is interrupted.

11. A recording method for system data used to control a disk device including a disk and a non-volatile memory, the recording method comprising:

recording a set of system data on both the non-volatile memory and the disk; and executing system data write processing including processing for writing the set of system data to the non-volatile memory and processing for writing the set of system data to the disk, wherein the system data write processing includes writing the set of system data to the disk after writing the set of system data to the non-volatile memory, and the disk device is equipped with a power loss protection function of protecting at least a part of one or more sets of data recorded on a volatile memory by recording at least the part of the one or more sets of data on the non-volatile memory when supply of power to the disk device is stopped, the recording method further comprises, when the set of system data is updated, determining whether or not a size of the set of system data updated is equal to or smaller than a predetermined size that can be protected by the power loss protection function, storing the set of system data updated in the volatile memory when it is determined that the size of the set of system data updated is equal to or smaller than the predetermined size, and executing the system data write processing and writing the set of system data updated to the non-volatile memory when it is determined that the size of the set of system data updated is larger than the predetermined size.

12. The recording method according to claim 11, further comprising:

executing the system data write processing in a case where it is determined that the set of system data is protected by the power loss protection function at a time when a power supply of the disk device is turned on, determining whether or not the system data write processing is interrupted in a case where it is determined that the set of system data is not protected by the power loss protection function at a time when the power supply of the disk device is turned on, and restarting the system data write processing in a case where it is determined that the system data write processing is interrupted.

* * * * *